(12) United States Patent
Duan et al.

(10) Patent No.: US 10,948,079 B2
(45) Date of Patent: Mar. 16, 2021

(54) TORQUE CONVERTER CLUTCH CONTROL SYSTEM HEALTH ESTIMATION

(71) Applicant: GM GLOBAL TECHNOLOGY OPERATIONS LLC, Detroit, MI (US)

(72) Inventors: Shiming Duan, Ann Arbor, MI (US); Chunhao J. Lee, Troy, MI (US); Zhen Zhang, West Bloomfield, MI (US); Peter P. Radecki, Union Lake, MI (US); Xiaodong Jia, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 16/052,958

(22) Filed: Aug. 2, 2018

(65) Prior Publication Data

US 2020/0040988 A1 Feb. 6, 2020

(51) Int. Cl.
*F16H 61/14* (2006.01)
*F16H 61/12* (2010.01)
(Continued)

(52) U.S. Cl.
CPC ........ *F16H 61/143* (2013.01); *B60W 10/026* (2013.01); *B60W 10/06* (2013.01);
(Continued)

(58) Field of Classification Search
CPC ............. F16H 61/14; F16H 2061/1208; F16H 2061/1212; F16H 2061/1216
See application file for complete search history.

(56) References Cited

U.S. PATENT DOCUMENTS

| 5,323,320 A | * | 6/1994 | Hathaway | ............. F16H 61/143 192/3.3 |
| 5,599,254 A | * | 2/1997 | Tomisawa | ............... F16H 61/12 192/3.3 |

(Continued)

FOREIGN PATENT DOCUMENTS

| CN | 1777769 A | 5/2006 |
| CN | 101440869 A | 5/2009 |

(Continued)

OTHER PUBLICATIONS

German Office Action for application No. 10 2019 115 637.8 dated Jan. 17, 2020, 7 pages.

(Continued)

*Primary Examiner* — Tisha D Lewis (57) ABSTRACT

A method of, and a system for, controlling and predicting the health of a torque converter clutch control system is provided. The method includes determining, via a controller, rotational input and output speeds of the torque converter and a torque converter clutch slip. The method also includes determining, via the controller, whether a set of predetermined conditions are met for predicting the health of the torque converter clutch control system. The method includes gathering a plurality of initial features of the vehicle propulsion system, determining statistical information about the plurality of initial features, and selecting at least one feature of the vehicle propulsion system based on the statistical information. Furthermore, the method includes classifying the health of the torque converter clutch control system based on the selected feature or features. In some forms, principal component analysis is used to select the feature or features used for classification.

18 Claims, 5 Drawing Sheets

(51) Int. Cl.
*F16D 48/06* (2006.01)
*B60W 10/02* (2006.01)
*B60W 10/10* (2012.01)
*B60W 30/18* (2012.01)
*B60W 50/14* (2020.01)
*B60W 10/06* (2006.01)
*G07C 5/08* (2006.01)
*F16H 45/02* (2006.01)

(52) U.S. Cl.
CPC ............ *B60W 10/10* (2013.01); *B60W 30/18* (2013.01); *B60W 50/14* (2013.01); *F16D 48/066* (2013.01); *F16H 45/02* (2013.01); *G07C 5/0808* (2013.01); *G07C 5/0816* (2013.01); *G07C 5/0841* (2013.01); *B60W 2510/0241* (2013.01); *B60W 2510/0283* (2013.01); *B60W 2510/0652* (2013.01); *B60W 2510/0657* (2013.01); *B60W 2510/1005* (2013.01); *B60W 2510/107* (2013.01); *B60W 2540/10* (2013.01); *B60W 2540/12* (2013.01); *B60W 2710/024* (2013.01); *B60W 2710/0666* (2013.01); *B60W 2710/1005* (2013.01); *F16D 2500/1045* (2013.01); *F16D 2500/10412* (2013.01); *F16D 2500/3065* (2013.01); *F16D 2500/3068* (2013.01); *F16D 2500/30406* (2013.01); *F16D 2500/30415* (2013.01); *F16D 2500/30426* (2013.01); *F16D 2500/30803* (2013.01); *F16D 2500/30806* (2013.01); *F16D 2500/3144* (2013.01); *F16D 2500/31426* (2013.01); *F16D 2500/50233* (2013.01); *F16D 2500/7101* (2013.01)

(56) References Cited

U.S. PATENT DOCUMENTS

| | | | | |
|---|---|---|---|---|
| 5,609,067 | A | * | 3/1997 | Mitchell ................. F16H 61/12 192/3.63 |
| 5,721,682 | A | * | 2/1998 | Arai ...................... F16H 61/143 192/103 R |
| 2012/0035819 | A1 | * | 2/2012 | Hebbale ................. F16H 61/00 701/60 |
| 2013/0296123 | A1 | * | 11/2013 | Doering ................ B60W 10/02 477/5 |
| 2017/0292594 | A1 | * | 10/2017 | Zhang ................... F16H 61/143 |
| 2018/0058415 | A1 | | 3/2018 | Lin et al. |

FOREIGN PATENT DOCUMENTS

| | | |
|---|---|---|
| CN | 101531136 A | 9/2009 |
| CN | 108223783 A | 6/2018 |
| JP | 2011169389 A | 9/2011 |

OTHER PUBLICATIONS

U.S. Appl. No. 15/446,595 by GM Global Technology Operations LLC, filed on Aug. 28, 2017, titled, "Method and Apparatus for Predicting Operating Health of a Torque Converter Clutch".

U.S. Appl. No. 15/688,457 by GM Global Technology Operations LLC, filed on Mar. 1, 2017, titled, "Controller Architecture for Monitoring Health of an Autonomous Vehicle".

U.S. Appl. No. 15/830,262 by GM Global Technology Operations LLC, filed on Dec. 4, 2017, titled, "Method and Apparatus to Monitor an On-Vehicle Fluidic Subsystem".

Chinese Office Action application No. 201910496034.7 dated Aug. 20, 2020, 10 pages.

\* cited by examiner

TORQUE CONVERTER CLUTCH CONTROL SYSTEM HEALTH ESTIMATION

INTRODUCTION

The disclosure relates to a method and an apparatus for estimating the health of a vehicle transmission torque converter clutch control system.

Modern motor vehicles frequently employ a propulsion system that includes a power-source, such as an internal combustion engine, connected to a multi-speed automatically-shiftable, automatic, or continuously variable transmission that is adapted to manipulate and transmit power from the engine to a final drive (e.g., driveshaft, differential, and wheels) for propelling the vehicle. Traditional propulsion systems having an automatic transmission generally include a hydrodynamic input device, such as a torque converter, positioned between the engine and the transmission. The torque converter is a hydrodynamic fluid coupling employed predominantly to allow the engine to run without stalling when the vehicle wheels and transmission gears come to a stop, and to provide torque multiplication in the lower speed range of the engine.

The hydrodynamic torque converter generally includes an impeller member, a bladed turbine, and a fluid stator. The impeller member, also referred to in the art as the torque converter pump, is secured to an annular shell member that is adapted to drivingly connect the impeller to the engine crankshaft. The bladed turbine is traditionally connected to an input shaft of the automatic transmission through a turbine hub. The stator mechanism, disposed between the fluid inlet of the impeller and the fluid outlet of the turbine, redirects fluid from the turbine to the impeller to improve flow efficiency and increase torque multiplication of the torque converter. The impeller accelerates hydraulic fluid for passage to the turbine; and the turbine in turn converts the kinetic energy from the hydraulic fluid into mechanical energy, which is transmitted to the transmission input shaft.

In many torque converter assemblies, the annular shell member and the bladed turbine cooperate to form a chamber for housing a torque converter clutch (or "TCC"), also referred to in the art as a lock-up clutch. The TCC is operated to provide a functional bypass mechanism, allowing the engine to circumvent the torque converter fluid coupling and transmit power directly to the transmission. Additionally, a majority of modern TCC's employ a friction clutch having a pressure plate with a friction surface disposed thereon and biased out of engagement with the annular shell member by a spring member. The pressure plate responds to a hydraulic actuator imparting fluid pressure thereto, urging the friction surface against the annular shell member, effectively locking the impeller to the turbine. The TCC may be fully engaged (completely locked-up), partially engaged (selectively "slip" in a controllable manner), or disengaged (not coupled).

Reciprocating internal combustion engines generate torque through discrete combustion firing events; the torque generated is inherently high in vibration content tracking the combustion frequency of the engine. A damper or isolator, often composed of rotational springs, exists in the torque converter to help absorb engine firing vibrations and is commonly located between the clutch and the transmission input shaft. In many conditions the isolator cannot sufficiently attenuate the engine input vibration. In other conditions locking the TCC would result in stalling the engine. Control of a TCC is a real-time continual balance between minimizing slip to provide efficient transmission of power while minimizing vibration disturbances to provide pleasing driveability, no stalls, and attenuate of vibration disturbances from the engine.

Poor control of TCC slip can result in degraded fuel economy and poor driveability feel to vehicle occupants. Symptoms of bad TCC control include but are not limited to: loss of isolation of engine firing pulses (often 10 Hz to 450 Hz) which transmit into driveline and vehicle body often called 'boom', significant heat generation at TCC such that permanent clutch or ATF damage occurs, engine speed oscillation (often 0.2 Hz to 3 Hz) that results in audible changes in exhaust pitch and visible oscillation of tachometer indicator, or large changes in engine speed that cause the clutch to inadvertently "crash" or lock-up causing a bump as the engine inertia impacts the driveline as an impulse. Additional faults of the TCC system can include inadvertent clutch engagements (lock-ups), disengagements (releases), or shudder. TCC shudder is a phenomenon where friction characteristics of the wet clutch coupled with the driveline dynamics results in an instability at the clutch interface. Energy from engine torque or road inputs excite the instability which results in a vibration that oscillates at a natural frequency (often 4 Hz to 70 Hz) of the driveline, typically the first or second rotational mode shape of the driveline.

Unfortunately, several different faults within the torque converter system can result in poor controllability conditions that ultimately may result in the vehicle needing service. Some causes of poor controllability or shudder may include, but are not limited to: friction paper on the torque converter clutch degrading and deforming as pressure is applied; the friction interface being inconsistent; damping in other parts of the system; the pressure control system providing inadequate control of the TCC; glazing or poor calibration; and contamination, degradation, or misformulation of the automatic transmission hydraulic fluid.

The TCC control system continually varies how the TCC is operated, which results in difficulty in identifying poor control or shudder. Furthermore, any one or a combination of symptoms may be observed. Symptom vibration frequencies and amplitudes may change with engine speed, vehicle speed, gear, temperature, and load conditions and may have unique signatures depending on vehicle architecture. Other vehicle symptoms, for example bad spark plug, fuel injector, brakes, or tire imbalance, can have overlapping vibration signatures which adds difficulty to observing and estimating the TCC control performance or health. It is common for a customer to not notice a problem until severe damage is present that caused collateral damage to other components.

SUMMARY

The present disclosure provides a system and method of controlling and predicting the health of the torque converter clutch control system, where poor controllability can be detected before the wet clutch is severely degraded and before symptoms, oscillations, disturbances, degraded fuel economy, or shudder are noticeable to a customer. The system may be passive and wait for the desired running conditions, such as when the TCC is in the slip mode, to perform a degradation analysis on certain features, without itself causing a change in running conditions to perform the diagnosis. The features selected for analysis may be selected by principal component analysis or another desirable method. The selected features are then used to classify the torque converter clutch control system as healthy or unhealthy.

In one form, which may be combined with or separate from the other forms disclosed herein, a method of controlling and predicting the health of a torque converter clutch control system of a torque converter of a vehicle propulsion system is provided. The method includes determining, via a controller, rotational input and output speeds of the torque converter and a torque converter clutch slip based on the input and output speeds of the torque converter. The method also includes determining, via the controller, whether a set of predetermined conditions are met for predicting the health of the torque converter clutch control system. The method further includes gathering a plurality of initial features of the vehicle propulsion system, determining statistical information about the plurality of initial features, and selecting at least one feature of the vehicle propulsion system based on the statistical information to define at least one selected feature. The method includes classifying the health of the torque converter clutch control system based on the selected feature or features.

In another form, which may be combined with or separate from the other forms disclosed herein, a torque converter clutch control system is provided that has a controller comprising a processor and a non-transitory computer-readable medium containing instructions that, when executed, perform the method comprising the steps of: determining rotational input and output speeds of a torque converter; determining a torque converter clutch slip based on the input and output speeds of the torque converter; determining whether a set of predetermined conditions are met for predicting the health of the torque converter clutch control system; gathering a plurality of initial features of the vehicle propulsion system; determining statistical information about the plurality of initial features; selecting at least one feature of the vehicle propulsion system based on the statistical information to define at least one selected feature; and classifying the health of the torque converter clutch control system based on the selected feature or features.

In yet another form, which may be combined with or separate from the other forms disclosed herein, a motor vehicle propulsion system is provided that includes a power source configured to generate power-source torque, a transmission configured to transmit the power-source torque to a final drive assembly, and a torque converter configured to operatively connect the power source to the transmission. The torque converter has a fluid coupling configured to operatively connect the power source to the transmission and a lock-up clutch arranged operatively in parallel with the fluid coupling and selectively actuated to mechanically connect the power source to the transmission. The propulsion system further includes a controller configured to: determine rotational input and output speeds of the torque converter; determine a lock-up clutch slip based on the input and output speeds of the torque converter; determine whether a set of predetermined conditions are met for predicting the health of the lock-up clutch; gather a plurality of initial features of the vehicle propulsion system; determine statistical information, correlations, and/or causality about the plurality of initial features; select at least one feature of the motor vehicle propulsion system based on the statistical information to define at least one selected feature; and classify the health of the lock-up clutch based on the selected feature or features.

Additional features may be provided, including but not limited to the following: wherein the statistical information includes a maximum, a mean, a periodicity, a variance, a frequency, an amplitude, an autocorrelation, a power spectral density, a wavelet analysis, a Fourier analysis, a root mean square, and/or a mean squared error; executing, via the controller, a control action with respect to the torque converter clutch control system based on the classification of the health of the torque converter clutch control system; wherein principal component analysis is used to select the feature(s) of the vehicle propulsion system.

In some forms, the method and system may be capable of classifying the health as needing service in any desired engine speed oscillation range, such as in a range of 0.2 to 40 Hz. In some cases, the method and system can classify the health as needing service in a range as low as 0.2 to 3 Hertz.

The set of predetermined conditions may include one or more of the following: a transmission temperature being in an enablement range; the torque converter clutch slip being in a predetermined slip mode range; an engine speed being in a predetermined speed range; an accelerator pedal being in a predetermined throttle range; a brake pedal being in a predetermined braking range; a transmission being in a predetermined ratio range; an engine torque being in a predetermined torque range; and a torque converter clutch commanded pressure being in a predetermine pressure range. The selected feature(s) may be chosen from but not limited to the following: an amount of torque converter clutch slip, an amount of error of torque converter slip with respect to a commanded slip, a mode of the torque converter clutch (such as slip regulation mode or off mode), an amount of engine torque, the rotational output speed of the torque converter, an amplitude of an oscillation of a torque converter output shaft, and an amplitude of oscillation of a crankshaft in rotation, a rate of change in the amount of torque converter clutch slip, a rate of change of the error of the torque converter slip with respect to the commanded slip, a rate of change in the amount of engine torque, a rate of change of the rotational output speed of the torque converter, a frequency of the oscillation of the torque converter output shaft, and a frequency of the oscillation of the crankshaft in rotation.

Further additional features may be provided, such as: selecting the predetermined enable conditions using an optimization decision process, such as a greedy decision process; wherein executing the control action includes varying a hydraulic pressure of the torque converter clutch control system; wherein executing the control action includes activating a service indicator configured to signal that service of the torque converter clutch control system is required; determining an input torque to the torque converter; wherein executing the control action includes reducing the input torque; wherein executing the control action includes changing gears so that the engine speed and TCC slip speed can be operated in a different region that might provide improved control (e.g., lockup); wherein executing the control action includes changing the control mode of the TCC (e.g., changing the desired slip value, or locking up the torque converter, or disengaging the torque converter).

The above features and advantages, and other features and advantages of the present disclosure, will be readily apparent from the following detailed description when taken in connection with the accompanying drawings and appended claims.

DETAILED DESCRIPTION

Figure 1:
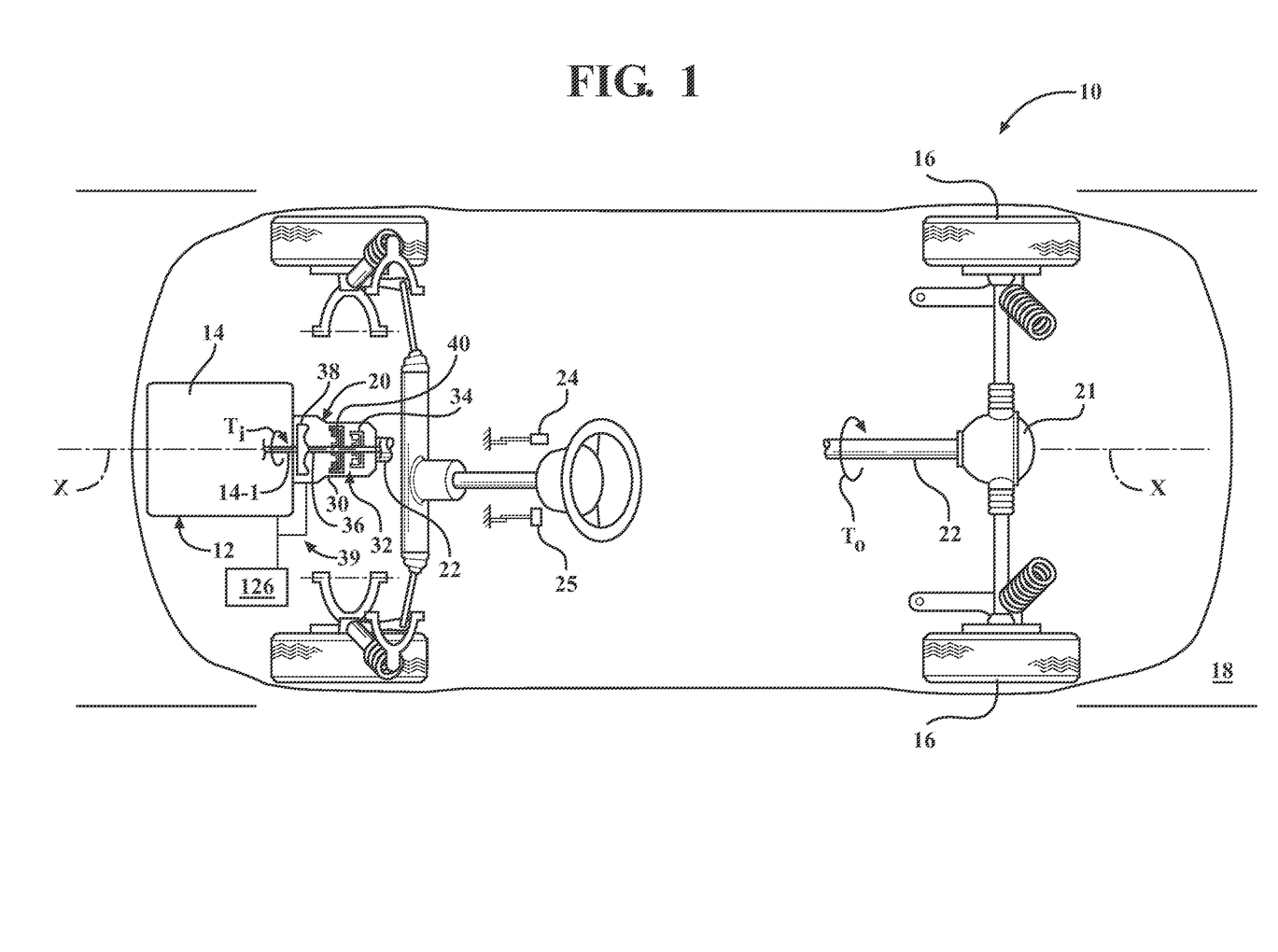
FIG. 1 is a schematic illustration of a vehicle employing a propulsion system that includes a torque converter and a torque converter clutch control system, according to principles of the present disclosure.

Referring to FIG. 1, a vehicle 10 having a powertrain or propulsion system 12 is depicted. The vehicle 10 may include, but not be limited to, a commercial vehicle, industrial vehicle, passenger vehicle, aircraft, watercraft, train or the like. It is also contemplated that the vehicle 10 may be another mobile platform, such as an airplane, all-terrain vehicle (ATV), boat, personal movement apparatus, robot and the like to accomplish the purposes of this disclosure. The propulsion system 12 includes a power source 14 configured to generate torque $T_i$ for propulsion of the vehicle 10 via drive wheels 16 relative to a road surface 18.

The propulsion system 12 also includes a transmission 20, which may be configured as an assembly that automatically shifts between or selects discrete gear-ratios, such as a multiple speed-ratio automatically-shiftable, a.k.a., automatic, or as a continuously variable gear-ratio transmission (CVT). The transmission 20 is operatively connected to the power source 14, i.e., externally mounted to the power source and configured to transfer the torque $T_i$ generated by the power source to the drive wheels 16. The transmission 20 is further configured to receive and then selectively multiply, reduce, or leave unmodified the torque $T_i$ to achieve a resultant transmission output torque $T_o$ for driving the vehicle 10. The drive wheels 16 may be operatively connected to the transmission 20, such as via a driveshaft 22, and configured to receive the transmission output torque $T_o$. A vehicle accelerator 24, such as a pedal or a lever, and a brake 25, are provided for the vehicle operator to control the power source torque $T_i$ for driving the vehicle 10. In other cases, pedals 24, 25 may not actually be required to control the power source torque such as when autonomous driving is used.

The power source 14 may include an internal combustion engine, a fuel-cell, and/or an electric motor (not shown) mounted in the vehicle 10 and having the transmission 20 mounted externally thereto. However, for conciseness and clarity, the present disclosure will concentrate on the embodiment of the power-source 14 that includes the internal combustion engine, which may or may not be provided in parallel with an electric motor. As such, the power-source input torque $T_i$ will be hereinafter referenced as engine 14 torque. Although not shown, the particular engine 14 includes a crankshaft for converting reciprocal motion of its pistons (not shown) into rotational motion and generating the input torque $T_i$.

Figure 2:
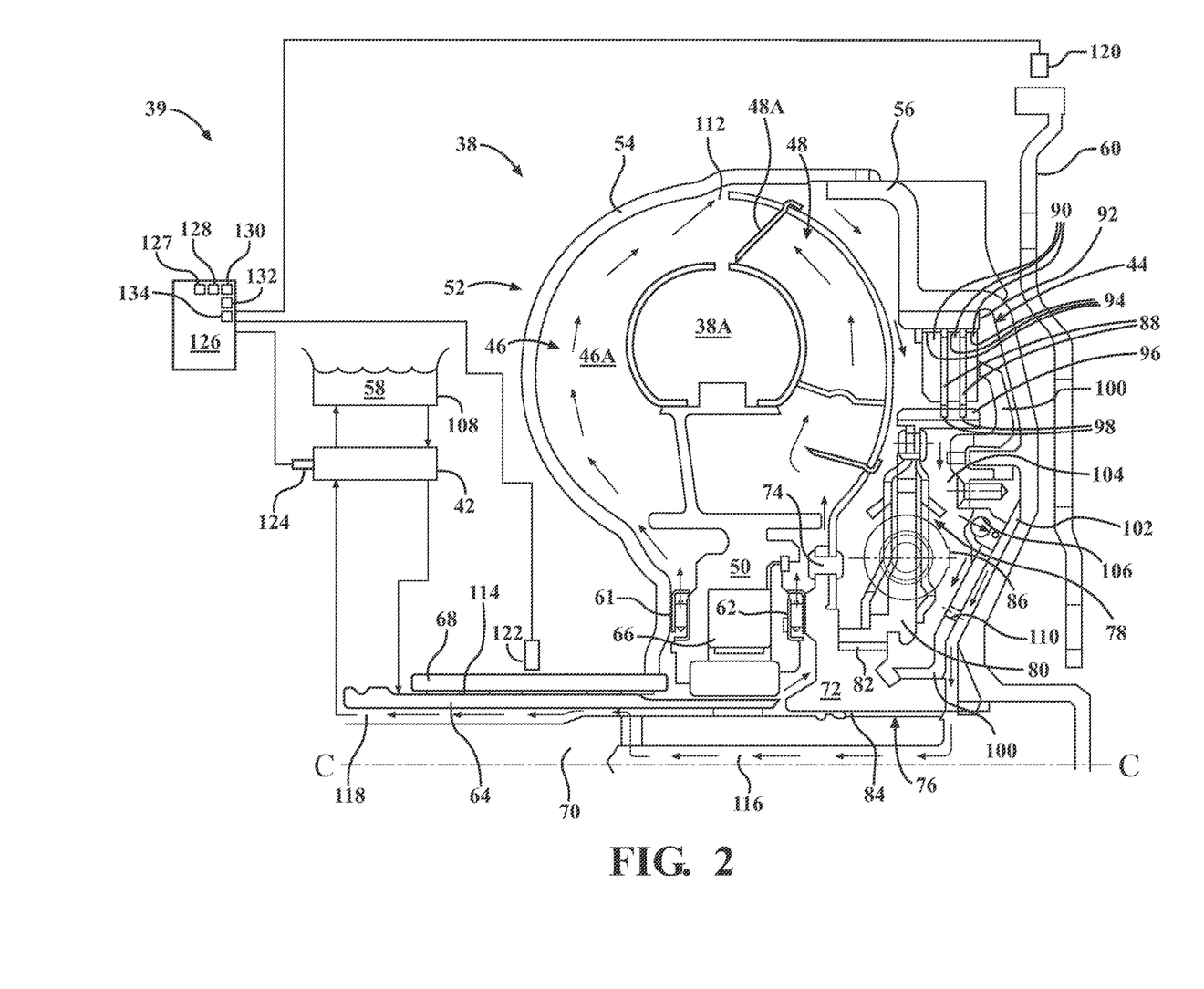
FIG. 2 is a schematic close-up cross-sectional side view of the torque converter and torque converter clutch control system shown in FIG. 1, in accordance with the principles of the present disclosure.

The transmission 20 connected to the engine 14 at an engine-transmission interface using, for example, threaded screws and dowels. As shown in FIG. 1, the transmission 20 includes a transmission housing or case 30 for retaining a gear-train 32 configured to provide a plurality of selectable gear ratios for operatively connecting the engine crankshaft to the drive wheels 16 and power the vehicle 10 in a variety of speed ranges. The gear-train 32 may include a number of gear elements 34, for example one or more planetary gear-sets (shown) or variable diameter pulleys (not shown) configured to provide a predetermined number of selectable gear ratios or a continuously variable gear ratio, respectively, and for operatively connecting the engine crankshaft to the drive wheels 16. The transmission 20 also includes an input member 36, such as a shaft, configured to receive the engine 14 torque $T_i$ and transfer the subject torque to the gear-train 32. As also shown in FIG. 2, the input member 36 is configured to rotate about an axis X. The transmission input member 36 is generally selectively connectable to the engine 14 through a torque converter assembly 38, such as via a flex plate and crankshaft 14-1. The torque converter assembly 38 is part of a torque converter clutch control system 39.

The transmission 20 may also include one or more torque transmitting devices 40, such as clutches and brakes, retained by the transmission housing 30. The gear-train 32 and the torque transmitting device(s) 40 are operatively connected to the input member 36 and are cooperatively configured to select transmission speed ratios to generate a predetermined amount of transmission output torque $T_o$. The transmission speed ratio is generally defined as the transmission input speed divided by the transmission output speed. Shifting from one speed ratio to another is typically performed in response to a position of the vehicle accelerator 24 and assessed vehicle road speed. Shifting between speed ratios generally involves releasing one or more "off-going" torque transmitting devices 40 associated with the current speed ratio, and applying one or more "on-coming" torque transmitting devices 40 associated with the desired speed ratio. The transmission 20 may be operatively connected to a differential or final-drive assembly 21 configured to transmit the transmission output torque $T_o$ to the drive wheels 16 for powering the vehicle 10. In the alternative, a CVT transmission may be employed, and the speed ratio may be varied by varying pulley diameters and pressures.

Referring now to FIG. 2, with continued reference to FIG. 1, the torque converter assembly 38 is arranged between the engine 14 and the transmission 20 and, as noted above, is configured to operatively connect the engine to the transmission. As shown in FIG. 2, the torque converter assembly 38 includes a lock-up clutch 44, which is depicted in the figures as an electronically controlled converter clutch or ECCC. The torque converter assembly 38 also includes a torque converter impeller 46 having impeller blades 46A and a turbine 48 having turbine blades 48A, which together form a fluid coupling portion 38A of the torque converter. The vehicle 10 also includes a fluid pump 42 configured to generate and supply a hydraulic pressure to the torque converter assembly 38 and which may be employed by the torque converter clutch control system 39 to selectively engage and control slip of a torque converter clutch (or ECCC) 44. The ECCC 44 that is illustrated is merely one example of a torque converter clutch (TCC) that may be employed by the torque converter assembly 38.

The ECCC 44 is arranged operatively in parallel with the fluid coupling 38A and configured to be selectively actuated by the hydraulic pressure generated via the pump 42 to mechanically connect the engine 14 to the transmission 20. The impeller 46 is situated in serial power flow, fluid communication with the turbine 48, and operates as a fluid pump to effect coupling with the turbine 48. The torque converter assembly 38 also includes a stator 50. The stator 50 is interposed between the impeller 46 and the turbine 48 and is configured to alter fluid flow returning from the turbine 48 to the impeller 46, as will be explained in more detail below. As shown, the torque converter assembly 38 also includes an annular housing member 52, defined by a pump shell portion 54 fixedly attached, e.g., via welding, to a front cover 56 such that a chamber full of hydraulic fluid 58 is formed therebetween. A flex plate 60 is adapted, e.g., via a plurality of fasteners (not shown), to both the engine 14 and the annular housing member 52 such that engine 14 torque $T_i$ is transferable therebetween.

To transfer engine 14 torque $T_i$ from the annular housing member 52 and the impeller 46 to the turbine 48 through operation of the hydraulic fluid 58, the impeller 46 is rotated to cause the hydraulic fluid 58 to be directed outward toward the turbine blades 48A. When the rotation of the impeller 46 generates sufficient fluid force to overcome resistance to rotation by the turbine 48, the turbine 48 begins to rotate coaxially with the impeller 46. The fluid flow exiting the turbine 48 is directed back into the impeller 46 by way of the stator 50. The stator 50 redirects the fluid flow from the turbine 48 to the impeller 46 in the same direction as impeller rotation, thereby reducing pump torque and causing torque multiplication.

The torque converter assembly 38 may include first and second thrust bearings 61, 62, configured to rotatably support the stator 50. The stator 50 may be connected to a stator shaft 64 by way of a one-way roller clutch 66 that is operable to prevent rotation of the stator 50 at low torque converter rotational speeds. At higher torque converter rotational speeds, the direction of hydraulic fluid 58 leaving the turbine 48 changes, causing the stator 50 to over-run the one-way clutch 66 and rotate freely on the stator shaft 64. The impeller 46 is secured to the pump hub 68, whereas the turbine 48 is secured to a turbine shaft 70. Additionally, a locking mechanism 72 is disposed between, and configured to operatively couple the turbine 48 and the turbine shaft 70. The locking mechanism 72 is secured to the turbine 48 by, for example, a plurality of rivets 74, and engages the turbine shaft 70 via a splined interface 76.

With continued reference to FIG. 2, the torque converter assembly 38 may also include an isolator or rotational damper 78. A radially inner portion 80 of the isolator 78 is splined at an interface 82 to the locking mechanism 72, which is in turn splined at an interface 84 to the turbine shaft 70. The isolator 78 includes a plurality of isolator springs 86 configured to at least partially absorb engine torque spikes in order to provide smoother vehicle operation.

The front cover 56 and turbine 48 cooperate to house the ECCC 44, positioned there between, within the torque converter assembly 38. As shown in FIG. 2, the ECCC 44 includes a friction clutch assembly or a clutch pack, which may include one or more friction plates 88 interleaved with one or more reaction plates 90. The reaction plates 90 are operatively connected to the front cover 56 of the annular housing member 52 via housing extension 92 by meshing engagement with splines 94. The friction plates 88 are operatively connected with a radial outer portion 96 of the isolator 78 by meshing engagement with splines 98. As shown, the ECCC 44 is hydraulically actuated, i.e., the various operating modes of the ECCC 44 are selectable by manipulating transfer of the hydraulic fluid 58 through the torque converter assembly 38 in a predetermined manner, as will be described in detail below.

In one example, the ECCC 44 includes a piston 100 configured to selectively bring the reaction plates 90 into frictional contact with the friction plates 88 and thereby engage the ECCC 44. A first cavity 102 is defined between the piston 100 and the front cover 56. A second cavity 104 is defined between the piston 100 and the isolator 78. The ECCC 44 includes a one-way valve 106 configured to control the transfer of hydraulic fluid 58 from the second cavity 104 to the first cavity 102. While a single one-way valve 106 is shown, it should be appreciated that multiple valves may alternatively be implemented, or another transfer path may be provided for. The pump 42 is fluidly coupled to the torque converter assembly 38 and operable to generate hydraulic pressure and transfer pressurized hydraulic fluid 58 from a sump volume 108 thereto. After being circulated through the torque converter assembly 38, the pump 42 returns the hydraulic fluid 58 to the sump volume 108.

The one-way valve 106 is operable to block the transfer of hydraulic fluid 58 from the first cavity 102 to the second cavity 104. Therefore, the transfer of hydraulic fluid 58 from the first cavity 102 to the second cavity 104 takes place almost exclusively through one or more orifices 110; the rate of such transfer is generally dictated by the size, e.g., diameter, of the orifice(s) 110. The orifice(s) 110 allow for the circulation of a predetermined amount of hydraulic fluid 58 throughout the torque converter assembly 38 to mitigate heat buildup. The hydraulic fluid 58 in the second cavity 104 is received through an opening 112 between the turbine 48 and the pump shell portion 54. After transferring through the opening 112, the hydraulic fluid 58 passes via a first flow path across the blades 48A of the turbine 48 and through the second thrust bearing 62, and via a second flow path across the blades 46A of the impeller 46 and through the thrust bearing 61. The first and second flow paths come together at a release passage 114, which routes the hydraulic fluid back to the sump volume 108 of FIG. 1.

When the fluid pressure in the second cavity 104 exceeds the pressure in the first cavity 102, the piston 100 translates axially along a centerline C in a direction toward the flex plate 60 (as shown in FIG. 2), thereby disengaging the clutch pack, i.e., reaction plates 90 and friction plates 88. When the fluid pressure in the first cavity 102 exceeds that in the second cavity 104, the piston 100 translates axially along centerline C in a direction away from the flex plate 60, thereby engaging the clutch pack. The amount by which the pressure in the first cavity 102 exceeds the pressure in the second cavity 104 dictates the degree of ECCC 44 engagement. By way of example, if the pressure in the first cavity 102 even slightly exceeds the pressure in the second cavity 104, the ECCC 44 becomes at least partially engaged, and may therefore slip.

The ECCC 44 has three primary operational modes: "disengaged", "fully engaged", and "partially engaged". "Disengaged" refers to the mode wherein the reaction plates 90 and friction plates 88 do not come into contact with each other and are therefore free to rotate independently. "Fully engaged" refers to the mode wherein the reaction plates 90 and friction plates 88 are brought into engagement with an apply force that is sufficient to substantially prevent relative rotation or "slip" under normal operating conditions. "Partially engaged" refers to the mode wherein the reaction plates 90 and friction plates 88 are brought into engagement with a reduced apply force such that the reaction plates 90 and friction plates 88 slip relatively in a controllable manner. By controlling the pressure levels in the cavities 102 and 104, as described above, the ECCC 44 may correspondingly be controlled to disengage, completely engage, or partially engage and slip in a controllable manner.

When the ECCC 44 is in the disengaged mode, the engine 14 transfers torque $T_i$ through the torque converter assembly 38 to the transmission 20. Specifically, torque $T_i$ is passed from the engine crankshaft through the flex plate 60 (adapted to drivingly connect the engine to the housing member 52) to the impeller 46. Thereafter, engine torque $T_i$ is transferred from the impeller 46 to the turbine 48 through operation of the hydraulic fluid 58, as described above. The turbine 48 is coupled to the turbine shaft 70, which is operatively connected to a driving member (not shown) of the transmission 20. When the ECCC 44 is disengaged, the path of engine torque $T_i$ bypasses the isolator 78.

When the ECCC 44 is fully engaged, the engine torque $T_i$ circumvents the fluid coupling portion 38A, i.e., the impeller 46 and the turbine 48, of the torque converter assembly 38, transmitting the engine torque directly to the transmission 20 without efficiency losses associated with the operation of the hydraulic fluid 58. As will be described in detail hereinafter, engagement of the ECCC 44 couples the impeller 46 and the turbine 48 such that the two components rotate as a single unit. When the ECCC 44 is fully engaged, the path of the engine torque $T_i$ is through the isolator 78, and the inertia of the turbine 48 is downstream relative to the isolator 78.

When the ECCC 44 is partially engaged, it may selectively slip in a controllable manner and thereby transfer torque $T_i$ both directly to the transmission 20 through the isolator 78, and via the fluid coupling portion 38A. By controlling the degree of ECCC 44 engagement, and correspondingly the amount of slip, the ECCC 44 may be implemented to at least partially absorb engine torque $T_i$ spikes and thereby provide smoother operation of the vehicle 10.

To release the ECCC 44, the pump 42 is operated to transfer hydraulic fluid 58 through the torque converter assembly 38 in the direction of the arrows of FIG. 2. The hydraulic fluid 58 is transferred initially from the sump volume 108 through the release passage 114 between the pump hub 68 and the stator shaft 64. The hydraulic fluid 58 thereafter passes through the first thrust bearing 61, across the blades 46A of the impeller 46, and the second thrust bearing 62, across the blades 48A of the turbine 48. Subsequently, the hydraulic fluid 58 exits through the opening 112 between the turbine 48 and the shell 54 of the housing member 52, passes by the clutch pack, i.e., plates 88, 90, of the ECCC 44, and into the second cavity 104. The hydraulic fluid 58 is then transferred from the second cavity 104 to the first cavity 102 through the one-way valve 106 and orifice 110, which is then transferred through a third cavity 116 defined by the turbine shaft 70, out of an apply passage 118 between the stator shaft 64 and the turbine shaft 70, and back to the sump 108. It should be readily appreciated that the pumping of hydraulic fluid 58 into the second cavity 104 generates pressure therein such that the piston 100 is translated away from the clutch pack, i.e., plates 88, 90, and the ECCC 44 remains disengaged.

To either partially or completely engage the ECCC 14, the pump 42 is operated to transfer hydraulic fluid 58 through the torque converter assembly 38 in a direction opposite to that shown by the arrows in FIG. 2. More specifically, to engage the ECCC 44, the pump 42 initially transfers hydraulic fluid 58 from the sump volume 108 through the apply passage 118 and into the first cavity 102, generating pressure therein such that the piston 100 is translated toward the clutch pack, i.e., friction plates 88 and reaction plates 90. Urging of the piston 100 in this manner applies a force tending to bring the reaction plates 90 into contact with the friction plates 88 such that the ECCC 44 is engaged. The magnitude of the force applied by the piston 100 is proportional to the pressure level in the first cavity 102. Therefore, the degree of ECCC 44 engagement is selectable by controlling the output of the pump 42 and the hydraulic pressure generated thereby, as the pump transfers hydraulic fluid 58 into the first cavity 102.

As shown in FIG. 2, the propulsion system 12 of the vehicle 10 may also include an input speed sensor 120 configured to detect a rotational input speed $W_i$ of the torque converter assembly 38, and a rotational output speed sensor 122 configured to detect an output speed $W_o$ of the torque converter assembly. The vehicle 10 may additionally include a hydraulic pressure sensor 124 configured to detect the hydraulic pressure generated by the pump 42. As shown in each of FIGS. 1 and 2, the torque converter clutch control system 39 further includes an electronic controller 126. The controller 126 may be a powertrain controller, for example, configured to regulate operation of the engine 14 and the automatic transmission 20 in response to command(s) from an operator of the subject vehicle. In order to appropriately perform the above tasks, the controller 126 includes a memory, at least some of which is tangible and non-transitory.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

The memory of the controller 126 may be a recordable medium that participates in providing computer-readable data or process instructions. Such a medium may take many forms, including but not limited to non-volatile media and volatile media. Non-volatile media for the controller 126 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

Memory of the controller 126 may also include a flexible disk or a hard disk, magnetic tape, other magnetic medium, a CD-ROM, DVD, other optical medium, etc. The controller 126 may be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 126 or accessible thereby may be stored in the memory and automatically executed to provide the required functionality. The controller 126 is also configured to regulate operation of the ECCC 44 to achieve a predetermined amount of transmission output torque $T_o$. As shown in each of FIG. 1, the controller 126 may be in electronic communication with the input and output speed sensors 120, 122, and with the hydraulic pressure sensor 124, for predicting the health of and controlling the ECCC 44.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 3:
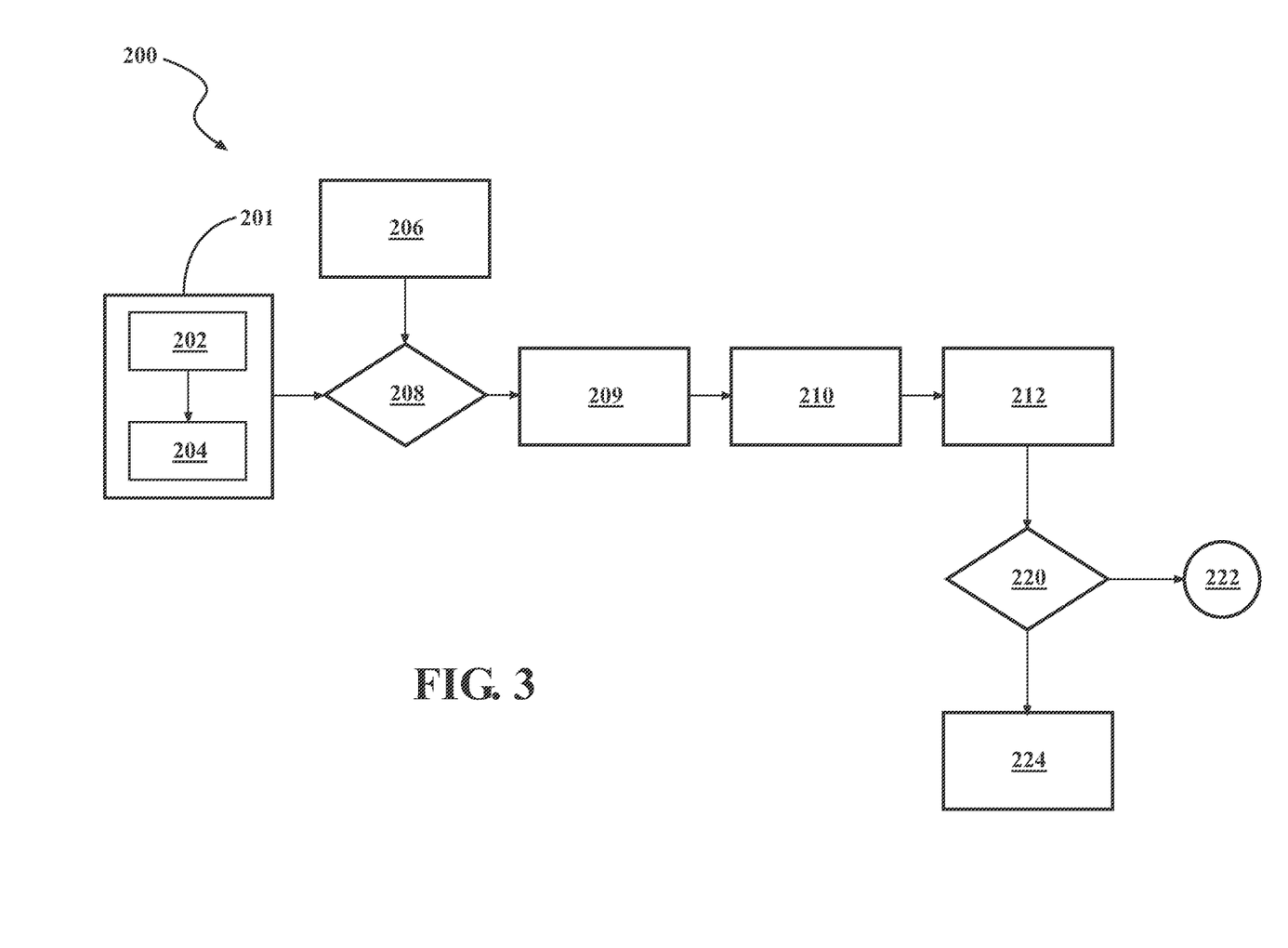
FIG. 3 is a flow diagram of a method for predicting the health and controlling operation of the torque converter clutch control system shown in FIGS. 1-2, which may be implemented by a controller, according to the principles of the present disclosure.

Referring now to FIG. 3, a method of controlling and predicting the health of the torque converter clutch control system 39 is illustrated and generally designated at 200. It should be understood that the method 200 may be implemented as an instruction set by the controller 126. The method 200 includes a step 202 of determining, via the controller 126, rotational input and output speeds of the torque converter 38 in a block 201. For example, the controller 126 may determine the rotational input and output speeds $W_i$, $W_o$ of the torque converter 38 via the input and output speed sensors 120, 122, respectively. The determination of the input and output speeds $W_i$, $W_o$ can be direct or indirect measurements or estimations of "input" and "output" speed sensors.

The method 200 may then include a step 204 in the block 201 of determining a torque converter clutch slip based on the input and output speeds $W_i$, $W_o$ of the torque converter 38. Additional information may also be gathered in the block 201, as desired. In another block 206, a set of enable variables may be identified. The enable variables may be chosen in the block 206 in any desired way, such as by a predetermined calibration, or by using an optimization decision process, such as a Greedy decision process that includes choosing the locally optimal choice at each level of the process, to determine which predetermined conditions to use for a given set of current conditions, which may also use machine learning. The set of predetermined conditions may include, for example, a transmission temperature being in an enablement range; the torque converter clutch slip being in a predetermined slip mode range; an engine speed being in a predetermined speed range; an accelerator pedal being in a predetermined throttle range; a brake pedal being in a predetermined braking range; a transmission being in a predetermined ratio range; an engine torque being in a predetermined torque range; and/or a torque converter clutch commanded pressure being in a predetermine pressure range.

An enablement step 208 may take into consideration the chosen enable variables determined in block 206 and the collected, calculated, or otherwise determined data determined in block 201 and determine whether the enable conditions have been met for predicting the health of the torque converter clutch control system 39. If the predetermined enable conditions have been met, the method 200 proceeds to an initial feature gathering step 209. In the initial feature gathering step 209, several initial features of the vehicle propulsion system are gathered, and then statistical information is determined about each of the initial features. For example, the initial feature gathering step 209 is configured to generate a set of closely correlated features from the transmission sensor and/or control signals. The statistical information that is determined may include a maximum, a mean, a periodicity, a variance, a frequency, an amplitude, an autocorrelation, a power spectral density, a wavelet analysis, a Fourier analysis, a root mean square, or a mean squared error, by way of example.

Next, a feature selection step 210 may be configured to identify and select the variables that would have the greatest effect on differentiating the data set. In other words, in order to classify the health of the torque converter clutch control system, a multitude of variables may be looked at, and a statistical procedure may be performed to determine which variable or variables are best to use for classifying the health of the torque converter clutch control system 39.

In one example, the feature or features are generated using the various signal processing and statistical methods, are then selected using principal component analysis. Principal component analysis (PCA) is a statistical procedure that decompose a set of signals or variables into linearly uncorrelated variables called principal components through a linear transformation. Any number of features may be taken into consideration and formed into matrices that are normalized to identify principal components. The first principal component has the greatest variance, or in other words, the first principal component accounts for the greatest variability in the data, and the second principal component has the greatest variance that is orthogonal to the first component, and so on. Thus, the classification of the health of the torque converter clutch control system 39 can be made by taking into account the first "n" number of principal components without considering other principal components that account for little variability in the data, which will help to reduce complexity of the subsequent classification process, where "n" is a positive integer.

Thus, a number of features may be taken into consideration, such as sixteen different initial features, by way of example. Statistical information may then be determined about the initial features. When PCA is used, the statistical information about the initial features is then decomposed into principal components, and the first one to three principal components are chosen, based on the PCA analysis. Some examples of input features that may be selected include: an amount of torque converter clutch slip, an amount of error of torque converter slip with respect to a commanded slip, a mode of the torque converter clutch, an amount of engine torque, the rotational output speed of the torque converter, an amplitude of an oscillation of a torque converter output shaft, and an amplitude of oscillation of a crankshaft in rotation, a rate of change in the amount of torque converter clutch slip, a rate of change of the error of the torque converter slip with respect to the commanded slip, a rate of change in the amount of engine torque, a rate of change of the rotational output speed of the torque converter, a frequency of the oscillation of the torque converter output shaft, and/or a frequency of the oscillation of the crankshaft in rotation. The PCA will further map these input features into a lower dimension space for the ease of later classification.

The features used for classification may be generated using other selection and reduction methods, such as, singular value decomposition (SVD) or a regression analysis, such as principal component regression, a time domain analysis, a frequency domain analysis, or any another desired mathematical function analysis methodology could be used.

The selected feature(s) are then delivered to module, step, or block 212, wherein the method 200 is configured to classify the health of the torque converter clutch control system 39 based on the selected features.

Figure 4:
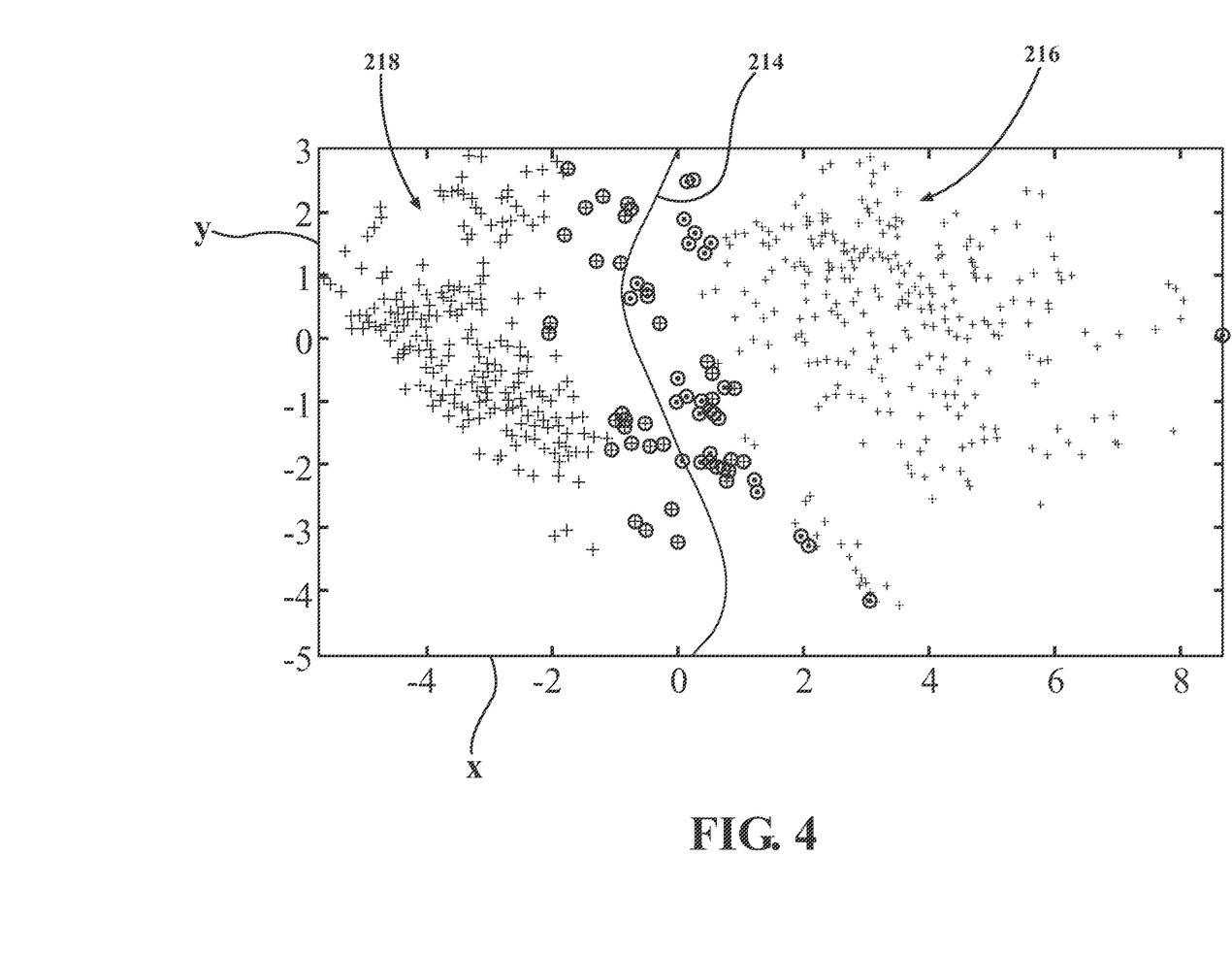
FIG. 4 is a graph of plotted points of vehicle system features with a first principal component on a horizontal axis and a second principal component on a vertical axis, showing both healthy and unhealthy data points for the torque converter clutch system of FIGS. 1-3, in accordance with the principles of the present disclosure.

Referring to FIG. 4, the first and second principal components may be plotted for data points of a selected feature or features. In the illustrated example, the first principal component is plotted along a horizontal axis x, and the second principal component is plotted along a vertical axis y. A boundary hyperplane 214 can be learned by differentiating between unhealthy data points (vectors) 216 and healthy data points (vectors) 218. The boundary hyperplane 214 may be determined, for example, by a supervised learning method such as a support vector machine (SVM). The classifier identiies to which of a set of classes a new sample belongs and is pre-trained with a historical dataset. For example, unhealthy data points 216 are illustrated with the symbol *, generally on the right side in the plot of FIG. 4, while the healthy data points 218 are illustrated with the symbol+, generally on the left side in the plot of FIG. 4. Support vectors used in SVM to determine the boundary between two classes in the hyperplane are shown with a circle around the vector. The classifying of the data is used to machine learn which data points (vectors) are healthy and which are unhealthy. In SVM, a data point is viewed as a $\rho$-dimensional vector and is separated by the boundary hyperplane 214, which is a $(\rho-1)$-dimensional hyperplane. Many different hyperplanes could separate the vectors, but the chosen hyperplane boundary 214 is the one that represents the largest separation, or margin, between the healthy vectors 218 and unhealthy vectors 216.

Accordingly, by performing principal component analysis, the principal component data points for the selected features for a particular system may be classified as generally having a desirable health or an undesirable health (faulty or in need of service), depending on where the data is located with respect to the boundary line 214. It should be understood that the boundary line 214 is not necessarily two-dimensional, as shown, and may represent any number of dimensions depending on the number of features/principal components selected for analysis.

Referring back to FIG. 3, after the torque converter health is classified in step or block 212, the method 200 may proceed to a step 220 of determining whether the classification is in a "healthy," or "desired," state-of-health (SOH) classification, wherein the torque converter clutch control system 39 is deemed to be working properly, or whether the classification is in an "unhealthy" or "in-need-of-service," SOH classification, wherein the torque converter clutch control system 39 is deemed to be in need of service.

The SOH classification of the torque converter clutch control system 39 may indicate a degradation of the torque converter clutch control system 39. Some reasons for the degradation or unhealthy classification may include a change in friction coefficient of the friction plates 88, which may result in slippage of the friction plates, and/or a variation in rotational speed $W_p$ of the friction plates 88 relative to the reaction plates 90. Such variation in rotational speed $W_p$ of the friction plates 88 may signal undesirable slip of the friction plates as a result of degradation of the friction coefficient and/or a drop in the magnitude of the hydraulic pressure.

If the classification is "healthy, "desirable," or the like, the method 200 may then end at step 222, and then may start over immediately, or upon certain predetermined conditions. If, however, the SOH classification is "unhealthy" or in need of service, the method 200 proceeds to a step 224, where the controller 126 executes a control action 130 with respect to the torque converter clutch control system 39, based on the "unhealthy" classification of the torque converter clutch control system 39. The control action 130 could include varying a hydraulic pressure of the torque converter clutch control system 39 to adjust the apply pressure and/or reducing the input torque $T_i$ to the torque converter 38, by way of example. In addition or in the alternative, the control action 130 may include activating a service indicator configured to signal that service of the torque converter clutch control system 39 is required. For example, the control action 130 may include activation of a sensory signal 134, such as a malfunction indicator light (MIL), configured to signal to either an operator of the vehicle 10 or a service provider that service of the ECCC 44 is required. The control action 130 may further include selective provision of a SOH classification 128 to a service provider for the torque converter clutch control system 39, and/or the control action 130 may additionally include limiting operation of the engine 12 to a prescribed limp-home mode, where the input torque $T_i$ is reduced to a predetermined value, if the SOH classification 128 is "unhealthy" or the like. In still other examples, the control action may include changing gears so that the engine speed and TCC slip speed can be operated in a different region that might provide improved control (e.g., lockup), and/or changing the control mode of the TCC (e.g., changing the desired slip value, or locking up the torque converter, or disengaging the torque converter). The control action 130 is intended to be executed by the controller 126 when the SOH classification 128 is "unhealthy" or the like.

In some examples, the health is classified as "unhealthy" or in need of service even with a relatively low amplitude shudder or low frequency oscillation that is unnoticeable by a driver. Traditionally, a vehicle driver may seek service after noticing shudder, which would be noticeable in a high frequency, large amplitude vibration range, for example, 25-40 Hertz. In the present method 200, the health may be classified as "unhealthy" or in need of service at in a large frequency range of shudder or engine speed oscillation frequencies, such as 0.2 to 40 Hz, or in some cases, 0.5 to 40 Hz. Thus, the unhealthiness may be recognized even at low engine speed oscillation frequencies, before a vehicle driver even feels the shudder or oscillation. For example, the health may be classified as needing service at engine speed oscillations as low as 0.2 to 3 Hertz, or in some cases, 0.5 to 3 Hz, in addition to higher ranges.

Referring to FIG. 2, the controller 126 may be programmed or configured to determine various enablement variables and variables to consider for selection. For example, the controller 126 may determine the input torque $T_i$ that is applied to the converter assembly 38. Such an input torque $T_i$ determination may be accomplished using a reference data table (not shown) programmed into the controller 126. The controller 126 may also be configured to determine the rotational input and output speeds $W_i$, $W_o$ of the torque converter assembly 38. Such a determination may include detection of the rotational input and output speeds via respective input and output speed sensors 120, 122 and receiving, via the controller 126, signals indicative of the subject speeds $W_i$, $W_o$ from the input and output speed sensors. The controller 126 may additionally configured to determine a magnitude 127 of the hydraulic pressure, which may be accomplished via a reference table (not shown) programmed into the controller, including data for the determined input torque $T_i$ versus hydraulic pressure and rotational input speed $W_i$. The determination of the magnitude 127 of the hydraulic pressure may alternatively be accomplished via receiving signals indicative of the detected hydraulic pressure from the sensor 124.

Figure 5:
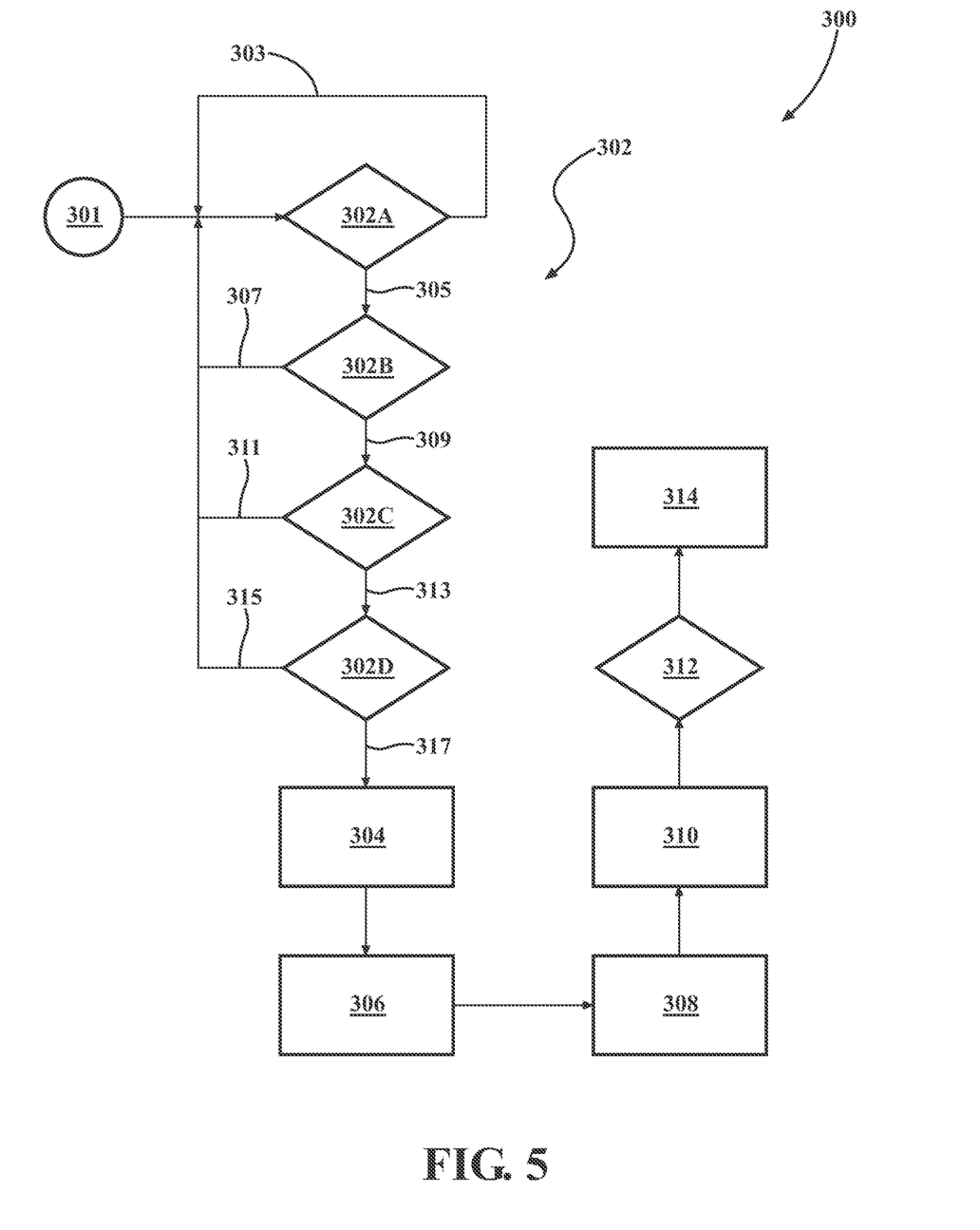
FIG. 5 is a flow diagram of another variation of a method for predicting the health and controlling operation of the torque converter clutch control system shown in FIGS. 1-2, which may be implemented by a controller, according to the principles of the present disclosure.

FIG. 5 depicts one example of a prognostic method 300 configured to predict health of the torque converter clutch control system 39 and to operate the torque converter clutch control system 39 in response to the predicted health. The method includes a series of enablement steps 302, separately labeled as 302A, 302B, 302C, 302D, that determine whether certain enable conditions have been met for predicting the health of the torque converter clutch control system 39. If the predetermined enable conditions have been met, the method 300 proceeds to a step 304. Though shown in the order 302A, 302B, 302C, 302D, the enablement steps 302 may be performed in any desired order.

In the illustrated example, the first enablement step 302A includes determining whether the vehicle 10 is cruising. If the vehicle 10 is not cruising, the method 300 proceeds along path 303 back to starting over. If the vehicle 10 is cruising, the method 300 proceeds along path 305 to the next enablement step 302B. The enablement step 302B includes determining whether the engine speed is in a predetermined desirable range. If the engine speed is not in the predetermined desirable range, the method 300 proceeds along path 307 back to starting over. If the engine speed is in the predetermined desirable range, the method 300 proceeds along path 309 to the next enablement step 302C. The enablement step 302C includes determining whether the torque converter 38 is operating constantly in a desired mode. For example, it may be desirable to only continue the health check if the torque converter 38 is engaged with a relatively constant targeted slip. In some examples, the targeted slip may be about 10-100 rpm. If the torque converter 38 is not operating constantly in the desired mode, the method 300 proceeds along path 311 back to starting over. If the torque converter 38 is operating constantly in the desired mode, the method 300 proceeds along path 313 to the next enablement step 302D. The enablement step 302D includes determining whether other enablement conditions are met. For example, this step 302D may include, by way of nonlimiting example, determining if a transmission is in a constant ratio (not in a gear change transition), or any other desired enablement criteria, some of which were mentioned above with respect to FIG. 3. If the additional enablement criteria are not met, the method 300 proceeds along path 315 back to starting over. If the additional enablement criteria are met, the method 300 proceeds along path 317 to step 304.

In step 304, the method 300, through use of the controller 126, may be configured to collect time series data, such as the amount of torque converter slip, the turbine speed, the engine speed, torque converter pressure, and/or engine torque, by way of example. Any other time series data used for the feature selection may also be collected.

The method 300 may then proceed to a step 306 that includes extracting or selecting features for use in classifying the health of the torque converter clutch control system 39. As explained above, the feature or features may be selected using a statistical procedure to identify the variables that would have the greatest effect on differentiating the data set. In other words, in order to classify the health of the torque converter, a multitude of variables may be looked at, and a statistical procedure may be performed to determine which variable or variables to use for classifying the health of the torque converter clutch control system 39. Further, as explained in greater detail above, the feature or features may be selected using principal component analysis (PCA). Statistical information is determined about selected feature(s) and used to select the features with the greatest effect on the variability of the data. The statistical information may include a maximum, a mean, a periodicity, a variance, a frequency, an amplitude, an autocorrelation, a power spectral density, a wavelet analysis, a Fourier analysis, a root mean square, or a mean squared error, by way of example. The selected features, or information, such as statistical information, about the selected features is delivered to module, step, or block 212, wherein the method 200 is configured to classify the health of the torque converter clutch control system 39 based on the selected features or data about the selected features. Some examples of features that may be selected may be based on: an amount of torque converter clutch slip, an amount of error of torque converter slip with respect to a commanded slip, a mode of the torque converter clutch, an amount of engine torque, the rotational output speed of the torque converter, an amplitude of an oscillation of a torque converter output shaft, and an amplitude of oscillation of a crankshaft in rotation, a rate of change in the amount of torque converter clutch slip, a rate of change of the error of the torque converter slip with respect to the commanded slip, a rate of change in the amount of engine torque, a rate of change of the rotational output speed of the torque converter, a frequency of the oscillation of the torque converter output shaft, and/or a frequency of the oscillation of the crankshaft in rotation.

Once the features are selected, the method 300 proceeds to step 308 of classifying the health (state-of-health SOH) of the torque converter clutch control system 39, based on the selected features. For example, as explained above with respect to FIG. 4, the first and second principal components may be plotted for a selected feature or features. The learned boundary line 214 differentiates between unhealthy data points 216 and healthy data points 218. Accordingly, by performing principal component analysis, or another statistical analysis on the selected feature or features, the data points for a particular system may be classified as generally having a desirable health or an undesirable health (faulty or in need of service), depending on where the data is located with respect to the boundary line 214. It should be understood that the boundary line 214 is not necessarily two-dimensional, as shown, and may represent any number of dimensions depending on the number of features selected for analysis.

Referring back to FIG. 5, after the torque converter health is classified in step 308, the method 300 may proceed to a step 310 of detecting degradation by determining whether the classification is in an "unhealthy" or "in-need-of-service," SOH classification, wherein the torque converter clutch control system 39 is deemed to need service. If, however, the classification is in a "healthy," or "desired," state-of-health (SOH) classification, wherein the torque converter clutch control system 39 is deemed to be working properly, then degradation is not determined to be true in step 310.

The method 300 then proceeds to a step 312 wherein a determination is made regarding whether maintenance is needed. If degradation was detected or determined in step 310, then maintenance is needed; if not, maintenance is not needed. Thus, if the classification is "healthy" in step 308, then degradation is not detected in 310, and step 312 determines that the method 300 ends, which may then may start over immediately or upon certain predetermined conditions. If, however, the SOH classification is "unhealthy" or in need of service, degradation is detected in step 310, and step 312 determines that maintenance is needed, and therefore, the method proceeds to a step 314, wherein a maintenance action is suggested or commanded. For example, in step 314, the controller 126 may execute a control action 130 with respect to the torque converter clutch control system 39. The control action 130 could include varying a hydraulic pressure of the torque converter clutch control system 39 to adjust the apply pressure and/or reducing the input torque $T_i$ to the torque converter 38, by way of example. In addition, or in the alternative, the control action 130 may include activating a service indicator configured to signal that service of the torque converter clutch control system 39 is required. For example, the control action 130 may include activation of a sensory signal 134, such as a malfunction indicator light (MIL), configured to signal to either an operator of the vehicle 10 or a service provider that service of the ECCC 44 is required. The control action 130 may further include selective provision of a SOH classification 128 to a service provider for the torque converter clutch control system 39, and/or the control action 130 may additionally include limiting operation of the engine 12 to a prescribed limp-home mode, where the input torque $T_i$ is reduced to a predetermined value, if the SOH classification 128 is less than a threshold, such as the boundary line 214. After step 314, then method 300 may end and restart.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling and predicting the health of a torque converter clutch control system of a torque converter of a vehicle propulsion system, the method comprising:
   determining, via a controller, rotational input and output speeds of the torque converter;
   determining, via the controller, a torque converter clutch slip based on the input and output speeds of the torque converter;
   determining, via the controller, whether a set of predetermined conditions are met for predicting the health of the torque converter clutch control system;
   gathering a plurality of initial features of the vehicle propulsion system;
   determining statistical information about the plurality of initial features;
   utilizing a mathematical method to select at least one feature of the vehicle propulsion system based on the statistical information to define at least one selected feature, the mathematical method being selected from one of the following: principal component analysis and singular value decomposition; and
   classifying the health of the torque converter clutch control system based on the at least one selected feature.

2. The method of claim 1, wherein the statistical information includes at least one of a maximum, a mean, a periodicity, a variance, a frequency, an amplitude, an auto-correlation, a power spectral density, a wavelet analysis, a Fourier analysis, a root mean square, and a mean squared error.

3. The method of claim 2, further comprising executing, via the controller, a control action with respect to the torque converter clutch control system based on the classification of the health of the torque converter clutch control system.

4. The method of claim 3, wherein selecting the at least one feature of the vehicle propulsion system is performed using principal component analysis.

5. The method of claim 4, further comprising classifying the health as needing service at an engine speed oscillation in the range of 0.2 to 3 Hertz.

6. The method of claim 4, wherein the set of predetermined conditions include a plurality of the following: a transmission temperature being in an enablement range; the torque converter clutch slip being in a predetermined slip mode range; an engine speed being in a predetermined speed range; an accelerator pedal being in a predetermined throttle range; a brake pedal being in a predetermined braking range; a transmission being in a predetermined ratio range; an engine torque being in a predetermined torque range; and a torque converter clutch commanded pressure being in a predetermine pressure range.

7. The method of claim 6, wherein the at least one selected feature is chosen based on at least one the following: an amount of torque converter clutch slip, an amount of error of torque converter slip with respect to a commanded slip, a mode of the torque converter clutch, an amount of engine torque, the rotational output speed of the torque converter, an amplitude of an oscillation of a torque converter output shaft, an amplitude of oscillation of a crankshaft in rotation, a rate of change in the amount of torque converter clutch slip, a rate of change of the error of the torque converter slip with respect to the commanded slip, a rate of change of the amount of engine torque, a rate of change of the rotational output speed of the torque converter, a frequency of the oscillation of the torque converter output shaft, and a frequency of the oscillation of the crankshaft in rotation.

8. The method of claim 7, further comprising:
selecting the predetermined conditions using an optimization decision process; and
machine learning a hyperplane boundary to classify the health of the torque converter clutch control system.

9. The method of claim 7, wherein executing the control action includes creating a diagnostic record of the torque converter clutch control system.

10. The method of claim 7, wherein executing the control action includes activating a service indicator configured to signal that service of the torque converter clutch control system is required.

11. The method of claim 7, further comprising determining an input torque to the torque converter, and wherein executing the control action includes at least one of the following: reducing the input torque, varying a hydraulic pressure of the torque converter clutch control system, changing a TCC control mode of the torque converter clutch control system, and varying a gear ratio of a transmission.

12. A torque converter clutch control system having a controller comprising a processor and a non-transitory computer-readable medium containing instructions that, when executed, perform the method comprising the steps of:
determining rotational input and output speeds of a torque converter;
determining a torque converter clutch slip based on the input and output speeds of the torque converter;
determining whether a set of predetermined conditions are met for predicting the health of the torque converter clutch control system;
gathering a plurality of initial features of a vehicle propulsion system;
determining statistical information about the plurality of initial features;
selecting at least one feature of the vehicle propulsion system based on the statistical information using principal component analysis to define at least one selected feature; and
classifying the health of the torque converter clutch control system based on the at least one selected feature.

13. The torque converter clutch control system of claim 12, wherein the statistical information includes at least one of a maximum, a mean, a periodicity, a variance, a frequency, an amplitude, an autocorrelation, a power spectral density, a wavelet analysis, a Fourier analysis, a root mean square, and a mean squared error.

14. The torque converter clutch control system of claim 13, further comprising the step of executing a control action with respect to the torque converter clutch control system based on the classification of the health of the torque converter clutch control system.

15. The torque converter clutch control system of claim 14, wherein the controller is configured to classify the health as needing service at an engine speed oscillation in the range of 0.2 to 3 Hertz.

16. The torque converter clutch control system of claim 14, wherein the set of predetermined conditions include a plurality of the following: a transmission temperature being in an enablement range; the torque converter clutch slip being in a predetermined slip mode range; an engine speed being in a predetermined speed range; an accelerator pedal being in a predetermined throttle range; a brake pedal being in a predetermined braking range; a transmission being in a predetermined ratio range; an engine torque being in a predetermined torque range; and a torque converter clutch commanded pressure being in a predetermine pressure range.

17. The torque converter clutch control system of claim 16, wherein the at least one selected feature is chosen based on at least one of the following: an amount of torque converter clutch slip, an amount of error of torque converter slip with respect to a commanded slip, a mode of the torque converter clutch, an amount of engine torque, the rotational output speed of the torque converter, an amplitude of an oscillation of a torque converter output shaft, and an amplitude of oscillation of a crankshaft in rotation, a rate of change in the amount of torque converter clutch slip, a rate of change of the error of the torque converter slip with respect to the commanded slip, a rate of change in the amount of engine torque, a rate of change of the rotational output speed of the torque converter, a frequency of the oscillation of the torque converter output shaft, and a frequency of the oscillation of the crankshaft in rotation.

18. A motor vehicle propulsion system comprising:
a power source configured to generate power-source torque;
a transmission configured to transmit the power-source torque to a final drive assembly;
a torque converter configured to operatively connect the power source to the transmission and having:
a fluid coupling configured to operatively connect the power source to the transmission; and
a lock-up clutch arranged operatively in parallel with the fluid coupling and selectively actuated to mechanically connect the power source to the transmission; and
a controller configured to:
determine rotational input and output speeds of the torque converter;
determine a lock-up clutch slip based on the input and output speeds of the torque converter;
determine whether a set of predetermined conditions are met for predicting the health of the lock-up clutch;
gather a plurality of initial features of the motor vehicle propulsion system;
determine statistical information about the plurality of initial features;
select at least one feature of the motor vehicle propulsion system based on the statistical information to define at least one selected feature; and
classify the health of the lock-up clutch based on the at least one selected feature
wherein the statistical information includes at least one of a maximum, a mean, a periodicity, a variance, a frequency, an amplitude, an autocorrelation, a power spectral density, a wavelet analysis, a Fourier analysis, a root mean square, and a mean squared error,
wherein the controller is configured to use principal component analysis to select the at least one feature of the vehicle propulsion system,
the controller being further configured to execute a control action based on the classification of the health of the lock-up clutch,
wherein the set of predetermined conditions include a plurality of the following: a transmission temperature being in an enablement range; the torque converter clutch slip being in a predetermined slip mode range; an engine speed being in a predetermined speed range; an accelerator pedal being in a predetermined throttle range; a brake pedal being in a predetermined braking range; a transmission being in a predetermined ratio range; an engine torque being in a predetermined torque range; and a torque converter clutch commanded pressure being in a predetermined pressure range, and wherein the at least one selected feature is chosen based on at least one of the following: an amount of torque converter clutch slip, an amount of error of torque converter slip with respect to a commanded slip, a mode of the torque converter clutch, an amount of engine torque, the rotational output speed of the torque converter, an amplitude of an oscillation of a torque converter output shaft, and an amplitude of oscillation of a crankshaft in rotation, a rate of change in the amount of torque converter clutch slip, a rate of change of the error of the torque converter slip with respect to the commanded slip, a rate of change in the amount of engine torque, a rate of change of the rotational output speed of the torque converter, a frequency of the oscillation of the torque converter output shaft, and a frequency of the oscillation of the crankshaft in rotation.

* * * * *